(12) United States Patent (10) Patent No.: US 9,122,520 B2
Addala et al. (45) Date of Patent: Sep. 1, 2015

(54) GENERIC WAIT SERVICE: PAUSING A BPEL PROCESS

(75) Inventors: Raju Addala, Westford, MA (US); Alok Singh, Fremont, CA (US); Scott Kozic, Sussex, WI (US); Sarita Sridharan, Fremont, CA (US); Sunita Datti, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1740 days.

(21) Appl. No.: 12/212,599

(22) Filed: Sep. 17, 2008

(65) Prior Publication Data

US 2010/0070973 A1 Mar. 18, 2010

(51) Int. Cl.
G06F 9/46 (2006.01)
G06F 9/48 (2006.01)
G06F 9/54 (2006.01)

(52) U.S. Cl.
CPC ............... *G06F 9/485* (2013.01); *G06F 9/542* (2013.01)

(58) Field of Classification Search
CPC ................................ G06F 9/485; G06F 9/542
USPC ............................. 709/224; 719/313; 718/100
See application file for complete search history.

(56) References Cited

U.S. PATENT DOCUMENTS

| | | |
|---|---|---|
| 4,595,981 A | 6/1986 | Leung |
| 5,659,754 A | 8/1997 | Grove et al. |
| 5,790,778 A | 8/1998 | Bush et al. |
| 5,850,518 A | 12/1998 | Northrup |
| 5,946,492 A | 8/1999 | Bates |
| 6,078,745 A | 6/2000 | De et al. |
| 6,117,180 A | 9/2000 | Dave et al. |
| 6,138,270 A | 10/2000 | Hsu |
| 6,154,877 A | 11/2000 | Ramkumar et al. |
| 6,161,219 A | 12/2000 | Ramkumar et al. |
| 6,397,254 B1 | 5/2002 | Northrup |
| 6,401,134 B1 | 6/2002 | Razavi et al. |
| 6,421,705 B1 | 7/2002 | Northrup |
| 6,442,751 B1 | 8/2002 | Cocchi et al. |
| 6,487,713 B1 | 11/2002 | Cohen et al. |

(Continued)

OTHER PUBLICATIONS

Altenhofen et al.; "ASMs in Service Oriented Architectures"; Journal of Universal Computer Science; vol. 14, No. 12; 2008.*

(Continued)

*Primary Examiner* — Andrew Caldwell
*Assistant Examiner* — Benjamin Geib
(74) *Attorney, Agent, or Firm* — Kilpatrick Townsend & Stockton LLP

(57) ABSTRACT

A generic wait service for facilitating the pausing of service-oriented applications. In one set of embodiments, the generic wait service receives, from a paused instance of an application, an initiation message comprising a set of key attributes and an exit criterion. The key attributes uniquely identify the paused instance, and the exit criterion identifies a condition that should be satisfied before the paused instance is allowed to proceed. The generic wait service then receives, from one or more event producers, notification messages comprising status information (e.g., statuses of business events) and information correlating the notification messages to particular instances. If a notification message is determined to be correlated to the paused instance, the generic wait service evaluates the exit criterion based on the status information included in the message. If the exit criterion is satisfied, the paused instance is notified of the status information and is allowed to proceed.

18 Claims, 8 Drawing Sheets

(56) References Cited

U.S. PATENT DOCUMENTS

| | | |
|---|---|---|
| 6,546,413 B1 | 4/2003 | Northrup |
| 6,601,233 B1 | 7/2003 | Underwood |
| 6,671,713 B2 | 12/2003 | Northrup |
| 6,671,746 B1 | 12/2003 | Northrup |
| 6,779,000 B1 | 8/2004 | Northrup |
| 6,807,636 B2 | 10/2004 | Hartman et al. |
| 6,901,580 B2 | 5/2005 | Iwanojko et al. |
| 6,922,675 B1 | 7/2005 | Chatterjee et al. |
| 6,922,705 B1 | 7/2005 | Northrup |
| 6,947,992 B1 | 9/2005 | Shachor |
| 6,954,792 B2 | 10/2005 | Kang et al. |
| 6,973,460 B1 | 12/2005 | Mitra |
| 6,990,532 B2 | 1/2006 | Day et al. |
| 7,028,019 B2 | 4/2006 | McMillan et al. |
| 7,062,749 B2 | 6/2006 | Cyr et al. |
| 7,086,009 B2 | 8/2006 | Resnick et al. |
| 7,117,216 B2 | 10/2006 | Chakraborty et al. |
| 7,177,878 B2 | 2/2007 | Wason |
| 7,188,158 B1 | 3/2007 | Stanton et al. |
| 7,203,938 B2 | 4/2007 | Ambrose et al. |
| 7,263,686 B2 | 8/2007 | Sadiq |
| 7,343,360 B1 | 3/2008 | Ristanovic et al. |
| 7,349,913 B2 | 3/2008 | Clark et al. |
| 7,505,990 B2 | 3/2009 | Krishna et al. |
| 7,535,927 B1 | 5/2009 | Northrup |
| 7,536,606 B2 | 5/2009 | Andrews et al. |
| 7,584,207 B2 | 9/2009 | Mortensen et al. |
| 7,590,644 B2 | 9/2009 | Matsakis et al. |
| 7,603,674 B2 | 10/2009 | Cyr et al. |
| 7,644,262 B1 | 1/2010 | Bromley et al. |
| 7,680,752 B1 | 3/2010 | Clune, III et al. |
| 7,685,604 B2 | 3/2010 | Baartman et al. |
| 7,693,851 B2 | 4/2010 | Becker |
| 7,721,158 B2 | 5/2010 | Lee |
| 7,774,477 B2 | 8/2010 | Zintel et al. |
| 7,783,782 B2 | 8/2010 | Cromp et al. |
| 7,788,338 B2 | 8/2010 | Savchenko et al. |
| 7,793,340 B2 | 9/2010 | Kiester et al. |
| 7,827,494 B1 | 11/2010 | Hedayatpour et al. |
| 7,840,941 B2 | 11/2010 | Brookins et al. |
| 7,853,899 B1 | 12/2010 | Damaschke et al. |
| 7,865,544 B2 | 1/2011 | Kordun et al. |
| 7,895,512 B2 | 2/2011 | Roberts |
| 7,933,946 B2 | 4/2011 | Livshits et al. |
| 7,945,907 B2 | 5/2011 | Dreiling et al. |
| 7,950,424 B2 | 5/2011 | Ozanne et al. |
| 7,954,111 B2 | 5/2011 | Waguet |
| 7,984,424 B2 | 7/2011 | Dengler et al. |
| 7,992,130 B2 | 8/2011 | Bozza et al. |
| 8,015,545 B2 | 9/2011 | Seto et al. |
| 8,032,390 B2 | 10/2011 | Waguet |
| 8,065,668 B2 | 11/2011 | Bosworth et al. |
| 8,074,214 B2 | 12/2011 | Isaacson et al. |
| 8,108,825 B2 | 1/2012 | Goodwin et al. |
| 8,122,292 B2 | 2/2012 | Nanjundaswamy |
| 8,166,450 B2 | 4/2012 | Fuhler et al. |
| 8,209,672 B2 | 6/2012 | Ivanov |
| 8,209,675 B2 | 6/2012 | Zhao et al. |
| 8,271,609 B2 | 9/2012 | Addala et al. |
| 8,332,654 B2 | 12/2012 | Anbuselvan |
| 8,423,973 B2 | 4/2013 | Saunders et al. |
| 8,494,832 B2 | 7/2013 | Krishnan et al. |
| 8,538,998 B2 | 9/2013 | Barrow |
| 8,560,938 B2 | 10/2013 | Barrow et al. |
| 8,667,031 B2 | 3/2014 | Konduri et al. |
| 8,782,604 B2 | 7/2014 | Konduri et al. |
| 8,788,542 B2 | 7/2014 | Barrow |
| 8,799,319 B2 | 8/2014 | Srinivasan et al. |
| 2002/0013938 A1 | 1/2002 | Duesterwald et al. |
| 2002/0023140 A1 | 2/2002 | Hile et al. |
| 2002/0103660 A1 | 8/2002 | Cramon et al. |
| 2002/0129060 A1 | 9/2002 | Rollins et al. |
| 2002/0143735 A1 | 10/2002 | Ayi et al. |
| 2002/0147757 A1 | 10/2002 | Day et al. |
| 2002/0188613 A1 | 12/2002 | Chakraborty et al. |
| 2003/0005117 A1 | 1/2003 | Kang et al. |
| 2003/0023587 A1 | 1/2003 | Dennis et al. |
| 2003/0025732 A1 | 2/2003 | Prichard |
| 2003/0033310 A1 | 2/2003 | Factor et al. |
| 2003/0034989 A1 | 2/2003 | Kondo |
| 2003/0084424 A1 | 5/2003 | Reddy et al. |
| 2003/0088857 A1 | 5/2003 | Balva et al. |
| 2003/0172127 A1 | 9/2003 | Northrup |
| 2003/0172168 A1 | 9/2003 | Mak et al. |
| 2003/0172193 A1 | 9/2003 | Olsen |
| 2003/0192031 A1 | 10/2003 | Srinivasan et al. |
| 2003/0204518 A1 | 10/2003 | Lang et al. |
| 2003/0204645 A1 | 10/2003 | Sharma et al. |
| 2003/0233631 A1 | 12/2003 | Curry et al. |
| 2003/0233642 A1 | 12/2003 | Hank |
| 2004/0046787 A1 | 3/2004 | Henry et al. |
| 2004/0046789 A1 | 3/2004 | Inanoria |
| 2004/0054991 A1 | 3/2004 | Harres |
| 2004/0073565 A1 | 4/2004 | Kaufman et al. |
| 2004/0078424 A1 | 4/2004 | Yairi et al. |
| 2004/0111533 A1 | 6/2004 | Beisiegel et al. |
| 2004/0111673 A1 | 6/2004 | Bowman et al. |
| 2004/0148588 A1 | 7/2004 | Sadiq |
| 2004/0181534 A1 | 9/2004 | Mortensen et al. |
| 2004/0194016 A1 | 9/2004 | Liggitt |
| 2004/0205117 A1 | 10/2004 | Hertling et al. |
| 2004/0205765 A1 | 10/2004 | Beringer et al. |
| 2004/0230639 A1 | 11/2004 | Soluk et al. |
| 2005/0044197 A1 | 2/2005 | Lai |
| 2005/0091639 A1 | 4/2005 | Patel |
| 2005/0097503 A1 | 5/2005 | Zintel et al. |
| 2005/0183074 A1 | 8/2005 | Alexander et al. |
| 2005/0193061 A1 | 9/2005 | Schmidt et al. |
| 2005/0223361 A1 | 10/2005 | Belbute |
| 2005/0251788 A1 | 11/2005 | Henke et al. |
| 2005/0273772 A1 | 12/2005 | Matsakis et al. |
| 2006/0010163 A1 | 1/2006 | Herzog et al. |
| 2006/0015847 A1 | 1/2006 | Carroll, Jr. |
| 2006/0031264 A1 | 2/2006 | Bosworth et al. |
| 2006/0031750 A1 | 2/2006 | Waldorf et al. |
| 2006/0036463 A1 | 2/2006 | Patrick et al. |
| 2006/0075387 A1 | 4/2006 | Martin et al. |
| 2006/0080117 A1 | 4/2006 | Carr et al. |
| 2006/0101038 A1 | 5/2006 | Gabriel et al. |
| 2006/0106626 A1 | 5/2006 | Jeng et al. |
| 2006/0117073 A1 | 6/2006 | Bosworth et al. |
| 2006/0130047 A1 | 6/2006 | Burugapalli |
| 2006/0136832 A1 | 6/2006 | Keller et al. |
| 2006/0143229 A1 | 6/2006 | Bou-Ghannam et al. |
| 2006/0150156 A1 | 7/2006 | Cyr et al. |
| 2006/0165105 A1 | 7/2006 | Shenfield et al. |
| 2006/0168132 A1 | 7/2006 | Bunter et al. |
| 2006/0168355 A1 | 7/2006 | Shenfield et al. |
| 2006/0168557 A1 | 7/2006 | Agrawal et al. |
| 2006/0184866 A1 | 8/2006 | Rees |
| 2006/0206858 A1 | 9/2006 | Becker et al. |
| 2006/0235733 A1 | 10/2006 | Marks |
| 2006/0235986 A1 | 10/2006 | Kim |
| 2006/0242636 A1 | 10/2006 | Chilimbi et al. |
| 2006/0253490 A1 | 11/2006 | Krishna et al. |
| 2006/0265702 A1 | 11/2006 | Isaacson et al. |
| 2006/0271537 A1 | 11/2006 | Chandrasekharan et al. |
| 2006/0277542 A1 | 12/2006 | Wipfel |
| 2006/0282767 A1 | 12/2006 | Suryanarayana et al. |
| 2006/0294474 A1 | 12/2006 | Taylor et al. |
| 2006/0294506 A1 | 12/2006 | Dengler et al. |
| 2007/0016429 A1 | 1/2007 | Bournas et al. |
| 2007/0055936 A1 | 3/2007 | Dhanjal et al. |
| 2007/0106975 A1 | 5/2007 | Deline |
| 2007/0113191 A1 | 5/2007 | Keller et al. |
| 2007/0130205 A1 | 6/2007 | Dengler et al. |
| 2007/0157078 A1 | 7/2007 | Anderson |
| 2007/0169199 A1 | 7/2007 | Quinnell et al. |
| 2007/0174763 A1 | 7/2007 | Chang et al. |
| 2007/0174822 A1 | 7/2007 | Moser et al. |
| 2007/0203956 A1 | 8/2007 | Anderson et al. |
| 2007/0220429 A1 | 9/2007 | Kureshy et al. |
| 2007/0240096 A1 | 10/2007 | Pontoppidan et al. |
| 2007/0245340 A1 | 10/2007 | Cohen et al. |

(56) References Cited

U.S. PATENT DOCUMENTS

| | | |
|---|---|---|
| 2007/0260575 A1 | 11/2007 | Robinson et al. |
| 2007/0266377 A1 | 11/2007 | Ivanov |
| 2007/0271552 A1 | 11/2007 | Pulley |
| 2007/0277095 A1 | 11/2007 | Ukigawa |
| 2007/0282885 A1 | 12/2007 | Baude et al. |
| 2007/0294586 A1 | 12/2007 | Parvathy et al. |
| 2007/0294664 A1 | 12/2007 | Joshi |
| 2008/0004887 A1 | 1/2008 | Brunswig et al. |
| 2008/0022257 A1 | 1/2008 | Baartman et al. |
| 2008/0028302 A1 | 1/2008 | Meschkat |
| 2008/0065675 A1 | 3/2008 | Bozich et al. |
| 2008/0077848 A1 | 3/2008 | Roberts |
| 2008/0083012 A1 | 4/2008 | Yu et al. |
| 2008/0104617 A1 | 5/2008 | Apacible et al. |
| 2008/0120557 A1 | 5/2008 | Offenhartz et al. |
| 2008/0126396 A1 | 5/2008 | Gagnon |
| 2008/0127087 A1 | 5/2008 | Brookins et al. |
| 2008/0127124 A1 | 5/2008 | Gilfix et al. |
| 2008/0162208 A1 | 7/2008 | Waguet |
| 2008/0162304 A1 | 7/2008 | Ourega |
| 2008/0162565 A1 | 7/2008 | Waguet |
| 2008/0163164 A1 | 7/2008 | Chowdhary et al. |
| 2008/0183479 A1 | 7/2008 | Iwashita et al. |
| 2008/0183744 A1 | 7/2008 | Adendorff et al. |
| 2008/0184201 A1 | 7/2008 | Burns et al. |
| 2008/0189358 A1 | 8/2008 | Charles |
| 2008/0189617 A1 | 8/2008 | Covell et al. |
| 2008/0196024 A1 | 8/2008 | Barfield et al. |
| 2008/0243901 A1 | 10/2008 | Super et al. |
| 2008/0250313 A1 | 10/2008 | Kamdar et al. |
| 2008/0275844 A1 | 11/2008 | Buzsaki et al. |
| 2008/0276218 A1 | 11/2008 | Taylor et al. |
| 2008/0276260 A1 | 11/2008 | Garlick et al. |
| 2008/0295109 A1 | 11/2008 | Huang et al. |
| 2008/0313648 A1 | 12/2008 | Wang et al. |
| 2008/0320246 A1 | 12/2008 | Fuhler et al. |
| 2009/0031280 A1 | 1/2009 | Koehler |
| 2009/0083297 A1 | 3/2009 | Pohl et al. |
| 2009/0089741 A1 | 4/2009 | Bornhoevd et al. |
| 2009/0094588 A1 | 4/2009 | Chipman |
| 2009/0106494 A1 | 4/2009 | Knebel |
| 2009/0144716 A1 | 6/2009 | Felts |
| 2009/0144729 A1 | 6/2009 | Guizar |
| 2009/0150565 A1 | 6/2009 | Crossner et al. |
| 2009/0157859 A1 | 6/2009 | Morris |
| 2009/0158237 A1 | 6/2009 | Zhang et al. |
| 2009/0178020 A1 | 7/2009 | Goodwin et al. |
| 2009/0204567 A1 | 8/2009 | Barrow |
| 2009/0204629 A1 | 8/2009 | Barrow |
| 2009/0204884 A1 | 8/2009 | Barrow et al. |
| 2009/0204943 A1 | 8/2009 | Konduri |
| 2009/0205013 A1 | 8/2009 | Lowes |
| 2009/0217153 A1 | 8/2009 | Oshima et al. |
| 2009/0259993 A1 | 10/2009 | Konduri et al. |
| 2009/0292797 A1 | 11/2009 | Cromp et al. |
| 2009/0313256 A1 | 12/2009 | Konduri et al. |
| 2010/0057482 A1 | 3/2010 | Radhakrishnan et al. |
| 2010/0057836 A1 | 3/2010 | Anbuselvan |
| 2010/0070553 A1 | 3/2010 | Addala et al. |
| 2010/0082556 A1 | 4/2010 | Srinivasan et al. |
| 2010/0132009 A1 | 5/2010 | Khemani et al. |
| 2010/0146291 A1 | 6/2010 | Anbuselvan |
| 2010/0236660 A1 | 9/2010 | Ozanne et al. |
| 2010/0313038 A1 | 12/2010 | Bradley |
| 2010/0332401 A1 | 12/2010 | Prahlad et al. |
| 2010/0332454 A1 | 12/2010 | Prahlad et al. |
| 2010/0333116 A1 | 12/2010 | Prahlad et al. |
| 2011/0010692 A1 | 1/2011 | Hattori et al. |
| 2011/0023071 A1 | 1/2011 | Li et al. |
| 2011/0047415 A1 | 2/2011 | Nanjundaswamy |
| 2011/0119649 A1 | 5/2011 | Kand et al. |
| 2011/0119651 A1 | 5/2011 | Utschig-Utschig et al. |
| 2011/0282829 A1 | 11/2011 | Rangaswamy et al. |
| 2012/0116980 A1 | 5/2012 | Mercuri |
| 2012/0296624 A1 | 11/2012 | Jeng et al. |
| 2013/0024424 A1 | 1/2013 | Prahlad et al. |
| 2013/0086568 A1 | 4/2013 | Krishnamurthy |
| 2014/0081896 A1 | 3/2014 | Ranganathan et al. |

OTHER PUBLICATIONS

Hohpe et al "Messaging Systems" Enterprise Integration Patterns 2004, pp. 57-97, Chapter 3, Pearson Education, Inc, Boston, Massachusetts.

Box et al., "Web Services Addressing (WS-Addressing)" Aug. 10, 2004, 23 pages, http://www.w3.org/Submission/ws-addressing/#_Toc77464317, printed on Aug. 18, 2009, 23 pages.

Carey, "Making BPEL Processes Dynamic" Oracle Technology Network, 8 pages, printed on Aug. 18, 2009, 8 pages.

Non-Final Office Action for U.S. Appl. No. 12/210,657 mailed on Apr. 25, 2011, 21 pages.

Non-Final Office Action for U.S. Appl. No. 12/210,657 mailed on Sep. 30, 2011, 21 pages.

Dynamic Structure in ADF UIX Pages, from Oracle ADF UIX Developer's Guide, Copyright 2001, 2004 Oracle, downloaded on Mar. 7, 2012 from http://download.oracle.com/otn_hosted_doc/jdeveloper/1012/uixhelp/uixdevguide/dynamic.html, 11 pages.

"Client-Server Modernization—From Oracle® Forms to Java," VGO Software Products, Copyright 2009 Vgo Software Inc., printed on Aug. 28, 2009, downloaded from URL: http://www.vgosoftware.com/products/evo/index.php, 2 pages.

"Vgo Software First to Convert Oracle Forms to Oracle ADF V11"; VGO News, Sep. 16, 2008, downloaded on Aug. 28, 2009 from URL: http://www.vgosoftware.com/about/news/view_article.php?new id=35 , 2 pages.

"Oracle Forms to Java Modernization" printed on Aug. 28, 2009, at URL: http://www.vgosoftware.com/products/evo/walkthrough.php; VGO Software Information printed 5 pages.

CipherSoft Inc, "Exodus-Main Features Benefits" Products, at URL: http://www.ciphersoftinc.com/products/expdus-features-benefits.html; printed on Aug. 28, 2009; 3 pages.

CipherSoft Inc, "Exodus™ Products," printed on Aug. 28, 2009, at URL: http://www.ciphersoftinc.com/products/migration-products-overview.html; 3 pages.

Shepherd, et al., "Oracle SCA—The Power of the Composite," An Oracle White Paper, Aug. 2009, Oracle, pp. 1-19, 19 pages.

Chappell, "Introducing SCA," David Chappell & Associates, Jul. 2007, pp. 1-22, 22 pages.

Chapman, et al., "SCA Service Component Architecture—Client and Implementation Model Specification for WS-BPEL," Mar. 21, 2007, SCA version 1.00, 15 pages, BEA Systems, Inc.

Beisiegel, et al., "SCA Service Component Architecture—Assembly Model Specification," Mar. 15, 2007, SCA version 1.00, 91 pages, BEA Systems, Inc.

"Business Process Language (BPEL) and Oracle BPEL Process Manager," Oracle FAQ, updated Jun. 26, 2004, printed on Nov. 11, 2009, at URL: http://www.oracle.com/technology/products/ias/bpel/htdocs/orabpel_faq.html?_template=. . . , 3 pages.

Zhang, et al., "Schema Based XML Security: RBAC Approach," Machine Simulator, Third International Conference on Computer Assisted Learning, Published 2003, at URL: http://citeseerx.ist.psu.edu/viewdoc/summary?doi=10.1.1.3.6016, pp. 1-15, 15 pages.

Smith, Portals: Toward an Application Framework for Interoperability,: Communications of the ACM, Oct. 2004, vol. 47, No. 10, pp. 93-97, 5 pages.

Phanouriou, "UIML: A Device-Independent User Interface Markup Language," Doctoral Dissertation, Virginia Polytechnic Institute and State University, Sep. 26, 2000, 172 pages.

"File and Registry Virtualization—the good, the bad, and the ugly," Jerry's Incoherent Babbling; Windows Connected Blog; Published Dec. 19, 2005; at URL: http://windowsconnected.com/blogs/jerry/archive/2005/12/19/file-and-registry-virtualization-the-good-the-bad-and-t . . . , 6 pages.

Hildebrandt, G., "Web-based Document Management", Apr. 2001, 22 pages.

Shang-Pin Ma, "Discovery-Based Service Composition," National Central University, Doctoral Dissertation. Jan. 2007, 109 pages.

(56) References Cited

OTHER PUBLICATIONS

Yang et al., "Web Component: A Substrate for Web Service Reuse and Composition". Proc. 14th Conf. Advanced Information Systems Eng. (CAiSE 02), LNCS 2348, Springer-Verlag, 2002, 16 pages.

"AJAX & Security: Vulnerability in DWR Security Logic Identified Can Potentially be exploited to launce DoS attacks and break into back-end servers", published Jan. 8, 2007, AjaxWorld™ Magazine, pp. 1-4 downloaded on Oct. 6, 2008 from http://ajax.sys-con.com/node/319868, 4 pages.

"Direct Web Remoting, About DWR's Javascript Security", 4 pages downloaded from http://directwebremoting.org/dwr/security/script-tag-protection on Oct. 6, 2008.

"Direct Web Remoting, DWR version 2—New and Noteworthy", 4 pages downloaded from http://directwebremoting.org/dwr/changelog/dwr20 on Dec. 5, 2008.

"Direct Web Remoting, DWR: Easy AJAX for JAVA", 2 pages downloaded from http://directwebremoting.org/dwr/overview/dwr on Oct. 6, 2008.

"Direct Web Remoting, Safari, GET and Request Forgery", 1 page downloaded from http://directwebremoting.org/dwr/security/allowGetForSafariButMakeForgeryEasier on Oct. 6, 2008.

"Direct Web Remoting, Security", 4 pages downloaded from http://directwebremoting.org/dwr/security on Oct. 6, 2008.

"Google Web Toolkit, Product Overview", 3 pages downloaded from http://code.google.com/webtoolkit/overview.html on Oct. 6, 2008.

"Oracle Application Framework", Oracle, Dec. 2006, pp. 1-242, 242 pages.

Claypool et al., "Optimizing Performance of Schema Evolution Sequences", Objects and Databases [online], 2000 [retrieved Feb. 7, 2012], retrieved from Internet: http://se-pubs.dbs.uni-leipzig.de/files/Claypool2000OptimizingPerformanceofSchemaEvolutionSequences.pdf, pp. 114-127, 14 pages.

Curphey et al., "Web Application Security Assessment Tools", IEEE, 2006, pp. 32-41, 10 pages.

Dipaola et al., "Subverting Ajax", Dec. 2006, 23rd CCC Conference, pp. 1-8, 8 pages.

Mietzner, et al., "Defining Composite Configurable SaaS Application Packages Using SCA Variability Descriptors and Multi-Tenancy Patters,", 2008, pp. 156-161.

Nagappan et al., "XML Processing and Data Binding with Java APIs" in: Developing Java Web Services: Architecting and Developing Secure Web Services Using Java [online], 2003 [retrieved Feb. 7, 2012], retrieved from Internet: http://java.sun.com/developer/Books/j2ee/devjws/, pp. 313-399, 89 pages.

Phillips, Josh. Window's Connected UseriD: Jerry. Jerry's Incoherent Babbling: "File and Registry Virtualization—the good, the bad, and the ugly". <http:/ /wi ndowsco n nected. co m/b logs/jerry/archive/2005/ 12/1 9/fi l e-and-reg istry-vi rtual izatio n-th e-good-th ebad-and-the-ugly.aspx>. Published: Dec. 19, 2005.

Steinberg, "Data Binding with JAXB" [online], 2003 [retrieved Feb. 7, 2012], retrieved from Internet: https://www6.software.ibm.com/developerworks/education/x-jabx/x-jaxb-a4.pdf pp. 1-34, 34 pages.

Non-Final Office Action for U.S. Appl. No. 12/029,600 mailed on Apr. 27, 2011, 29 pages.

Non-Final Office Action for U.S. Appl. No. 12/029,605 mailed on Jul. 20, 2011, 12 pages.

Non-Final Office Action for U.S. Appl. No. 12/029,605 mailed on May 12, 2010, 10 pages.

Final Office Action for U.S. Appl. No. 12/029,605 mailed on Sep. 28, 2010, 13 pages.

Non-Final Office Action for U.S. Appl. No. 12/029,609 mailed on May 26, 2010, 14 pages.

Final Office Action for U.S. Appl. No. 12/029,609 mailed on Oct. 13, 2010, 13 pages.

Non-Final Office Action for U.S. Appl. No. 12/203,816 mailed on Sep. 2, 2010, 16 pages.

Final Office Action for U.S. Appl. No. 12/203,816 mailed on Jan. 20, 2011, 23 pages.

Non-Final Office Action for U.S. Appl. No. 12/203,816 mailed on Oct. 26, 2012 30 pages.

Non-Final Office Action for U.S. Appl. No. 12/029,724 mailed on Dec. 14, 2010, 21 pages.

Final Office Action for U.S. Appl. No. 12/029,724 mailed on May 5, 2011, 19 pages.

Non-Final Office Action for U.S. Appl. No. 12/029,724 mailed on Jan. 7, 2013, 39 pages.

Final Office Action for U.S. Appl. No. 12/029,724 mailed on Apr. 30, 2013, 33 pages.

Non-Final Office Action for U.S. Appl. No. 12/138,997 mailed on Jun. 24, 2011, 14 pages.

Non-Final Office Action for U.S. Appl. No. 12/101,420 mailed on Oct. 5, 2011, 18 pages.

Final Office Action for U.S. Appl. No. 12/029,600 mailed on Oct. 19, 2011, 20 pages.

Terminal Disclaimer—Approved for U.S. Appl. No. 12/029,600 mailed on Oct. 25, 2011, 1 page.

Non-Final Office Action for U.S. Appl. No. 12/029,600 mailed on Sep. 17, 2012, 38 pages.

Notice of Allowance for U.S. Appl. No. 12/029,600 mailed on Nov. 7, 2012, 16 pages.

Notice of Allowance for U.S. Appl. No. 12/029,600 mailed on Feb. 5, 2013, 16 pages.

Final Office Action for U.S. Appl. No. 12/029,605 mailed on Nov. 2, 2011, 13 pages.

Non-Final Office Action for U.S. Appl. No. 12/029,605 mailed on Apr. 10, 2013, 38 pages.

Final Office Action for U.S. Appl. No. 12/029,609 mailed on Nov. 8, 2011, 13 pages.

Non-Final Office Action for U.S. Appl. No. 12/029,609 mailed on Jul. 28, 2011, 29 pages.

Notice of Allowance for U.S. Appl. No. 12/029,609 mailed on Feb. 4, 2013, 52 pages.

Final Office Action for U.S. Appl. No. 12/138,997 mailed on Dec. 5, 2011, 13 pages.

Non-Final Office Action for U.S. Appl. No. 12/487,004 mailed on Sep. 28, 2011, 29 pages.

Non-Final Office Action for U.S. Appl. No. 12/330,008 mailed on Dec. 21, 2011, 14 pages.

Non-Final Office Action for U.S. Appl. No. 12/029,615 mailed on Feb. 15, 2012, 27 pages.

Final Office Action for U.S. Appl. No. 12/101,420 mailed on Feb. 24, 2012, 20 pages.

Final Office Action for U.S. Appl. No. 12/487,004 mailed on Mar. 19, 2012, 30 pages.

Advisory Action for U.S. Appl. No. 12/487,004 mailed on May 24, 2012, 5 pages.

Final Office Action for U.S. Appl. No. 12/210,657 mailed on Apr. 3, 2012, 23 pages.

Final Office Action for U.S. Appl. No. 12/330,008 mailed on Apr. 10, 2012, 13 pages.

Notice of Allowance for U.S. Appl. No. 12/330,008 mailed on Jun. 11, 2012, 7 pages.

Notice of Allowance for U.S. Appl. No. 12/210,657 mailed on Jun. 26, 2012, 6 pages.

Final Office Action for U.S. Appl. No. 12/029,615 mailed on Jul. 31, 2012, 33 pages.

Advisory Action for U.S. Appl. No. 12/029,615 mailed on Oct. 16, 2012, 5 pages.

Notice of Allowance for U.S. Appl. No. 12/330,008 mailed on Aug. 7, 2012, 17 pages.

Non-Final Office Action for U.S. Appl. No. 12/790,437 mailed on Jan. 30, 2013, 31 pages.

Non-Final Office Action for U.S. Appl. No. 12/790,445 mailed on Dec. 19, 2012, 30 pages.

Claessens, J., et al., "A Tangled World Web of Security Issues." First Monday vol. 7, No. 3-4, (Mar. 2002): 24 pages. Web. Jun. 25, 2013.

U.S. Appl. No. 12/029,600, Notice of Allowance mailed on Jun. 11, 2013, 6 pages.

U.S. Appl. No. 12/029,605, Final Office Action mailed on Sep. 6, 2013, 19 pages.

(56) References Cited

OTHER PUBLICATIONS

U.S. Appl. No. 12/029,605, Advisory Action mailed on Dec. 18, 2013, 4 pages.
U.S. Appl. No. 12/029,609, Notice of Allowance mailed on May 29, 2013, 14 pages.
U.S. Appl. No. 12/101,420, Notice of Allowance mailed on Aug. 28, 2013, 9 pages.
U.S. Appl. No. 12/138,997, Notice of Allowance mailed on Nov. 27, 2013, 13 pages.
U.S. Appl. No. 12/203,816, Advisory Action mailed on Aug. 15, 2013, 3 pages.
U.S. Appl. No. 12/203,816, Final Office Action mailed on Jul. 5, 2013, 25 pages.
U.S. Appl. No. 12/487,004, Non Final Office Action mailed on Sep. 24, 2013, 22 pages.
U.S. Appl. No. 12/790,437, Final Office Action mailed on Jul. 12, 2013, 12 pages.
U.S. Appl. No. 12/790,445, Final Office Action mailed on Jul. 5, 2013, 10 pages.
Cetin et al., A mashup-based strategy for migration to service-oriented computing, IEEE International Conference on Pervasive Services, IEEE, Jul. 20, 2007.
Li et al., Leveraging legacy codes to distributed problem-solving environments: a Web services approach, Software: Practice and experience, vol. 34, No. 13, 2004, pp. 1297-1309.
Li et al., SGrid: a service-oriented model for the Semantic Grid, Future Generation Computer Systems, vol. 20, No. 1, 2004, pp. 7-18.
Sneed et al., Integrating legacy software into a service oriented architecture, Software Maintenance and Reengineering, CSMR, IEEE, 2006.
U.S. Appl. No. 12/487,004, Final Office Action mailed on Dec. 27, 2013, 18 pages.
U.S. Appl. No. 12/790,437, Non-Final Office Action mailed on Dec. 30, 2013, 15 pages.
U.S. Appl. No. 12/790,445, Non-Final Office Action mailed on Dec. 31, 2013, 13 pages.
U.S. Appl. No. 12/029,605, Notice of Allowance on Mar. 3, 2014, 9 pages.
U.S. Appl. No. 12/487,004, Notice of Allowance on Mar. 6, 2014, 5 pages.
Chen et. al., Feature Analysis for Service-Oriented Reengineering, IEEE 12th Asia-Pacific Software Engineering Conference (APSEC 2005), Dec. 2005, Taipei, Taiwan.
U.S. Appl. No. 12/029,615, Non-Final Office Action mailed on Mar. 21, 2014, 29 pages.
U.S. Appl. No. 12/101,420, Notice of Allowance mailed on Mar. 17, 2014, 8 pages.
U.S. Appl. No. 13/360,127, Non-Final Office Action mailed on Apr. 22, 2014, 16 pages.
Chappell et al., Ready for Primetime: The Next-Generation, Grid-Enabled Service-Oriented Architecture, SOA-The SOA Magazine, Sep. 3, 2007, pp. 1-10.
U.S. Appl. No. 12/029,724, Notice of Allowance mailed on Jun. 24, 2014, 13 pages.
U.S. Appl. No. 12/790,437, Notice of Allowance mailed on Jun. 12, 2014, 5 pages.
U.S. Appl. No. 12/790,445, Notice of Allowance mailed on Jun. 4, 2014, 5 pages.

* cited by examiner

GENERIC WAIT SERVICE: PAUSING A BPEL PROCESS

BACKGROUND OF THE INVENTION

Embodiments of the present invention relate to service-oriented computing, and more particularly relate to techniques for pausing an instance of a service-oriented application.

In recent years, many organizations have adopted Service-Oriented Architecture (SOA) for building and integrating their business applications. Generally speaking, SOA is a software model that encapsulates business functionality into a collection of modular software components, known as services. Each service exposes a well-defined interface that is independent of the service's underlying implementation (e.g., hardware/software platform, programming language, etc.). Using these interfaces, the various services can interact to provide services to, and consume services from, each other.

One advantage of the SOA paradigm is that business applications can be structured as compositions of one or more component services. These types of applications are referred to herein as service-oriented applications. For example, a service-oriented application for carrying out an order fulfillment business process may be structured as a composition of (1) an internal query service for retrieving the details of a customer order, (2) an external credit service for checking the customer's credit, (3) an internal inventory service for reserving the items included in the order, and (4) an external shipping service for processing shipment. The structural definition of a service-oriented application (including, for example, the types of services accessed, the sequencing of service operation invocations, fault handling, etc.) is typically expressed in an orchestration language, such as Business Process Execution Language (BPEL). A BPEL-based definition of a service-oriented application is known as a BPEL process.

In many instances, it may be desirable to suspend, or pause, the runtime flow of a BPEL process until one or more business conditions have been satisfied. For example, in the order fulfillment application above, it may be desirable to wait for verification that the customer's credit is satisfactory, and/or wait for confirmation that the customer's order items have been reserved, before proceeding to ship the order. According to one known approach, this "pausing" functionality can be implemented by using a synchronized message exchange between the BPEL process and the entities responsible for generating status information relevant to the business conditions (referred to herein as "event producers"). In this type of implementation, the BPEL process invokes an event producer and waits for an indication from the event producer that the business condition is satisfied before proceeding to the next task or step.

One problem with the above approach is that it requires the BPEL process to wait for responses from event producers in a serial fashion. Thus, the application cannot handle multiple simultaneous (or parallel) wait states in a single runtime instance. For example, using a synchronous message exchange pattern, an instance of the order fulfillment application cannot wait for responses from the credit service and the inventory service in parallel; rather, the instance must wait for a response from the credit service, and then wait for a response from the inventory service, or vice versa. This limits the types of task flows that can implemented within the process.

BRIEF SUMMARY OF THE INVENTION

Embodiments of the present invention address the foregoing and other such problems by providing a generic wait service for facilitating the pausing of service-oriented applications (e.g., BPEL processes). In one set of embodiments, the generic wait service receives, from a paused instance of an application, an initiation message comprising a set of key attributes and an exit criterion. The key attributes uniquely identify the paused instance, and the exit criterion identifies a condition that should be satisfied before the paused instance is allowed to proceed. The generic wait service then receives, from one or more event producers, notification messages comprising status information (e.g., statuses of business events) and information correlating the notification messages to particular instances. If a notification message is determined to be correlated to the paused instance, the generic wait service evaluates the exit criterion based on the status information included in the message. If the exit criterion is satisfied, the paused instance is notified of the status information and is allowed to proceed.

Since the processing performed by the generic wait service is performed independently and asynchronously of the calling application, the limitations associated with prior art "pausing" techniques are minimized or eliminated. For example, using the embodiments described herein, the calling application can be designed to incorporate multiple simultaneous (or parallel) wait states by simply making multiple, asynchronous calls to the generic wait service. Further, since all of the pausing logic (e.g., logic for correlating event statuses to specific instances, logic for determining when an exit criterion is satisfied, etc.) is encapsulated in the generic wait service, this logic does not need to be duplicated in each calling application or each event producer. Rather, these entities can simply interact with a single, central service (i.e., the generic wait service) to implement pausing functionality.

According to one embodiment of the present invention, a method performed by a generic wait service for pausing an instance of a service-oriented application comprises receiving, from the instance of the application, an initiation message including a first set of attributes that uniquely identify the instance, and an exit condition that identifies a condition that should be satisfied before the instance is allowed to proceed. The method further comprises creating a correlation set based on the first set of attributes, the correlation set associating the first set of attributes with the instance, and waiting for status information relevant to the instance. In one embodiment, the service-oriented application and the generic wait service are separate BPEL processes. In a further embodiment, the generic wait service is an asynchronous BPEL process.

In one set of embodiments, the method above further comprises receiving, from an event producer, a notification message including a second set of attributes and a status of a business event, and determining, based on the correlation set, whether the status is relevant to the instance. In an embodiment, the determining step comprises comparing the second set of attributes to the first set of attributes. If the status is relevant to the instance, the exit criterion is evaluated based on the status. If the exit criterion is satisfied, the status is sent to the instance and any further waiting for status information relevant to the instance is terminated. In an embodiment, the terminating step comprises deleting the correlation set.

In one set of embodiments, the initiation message includes a target condition identifying a condition that the instance would like to be notified of. In these embodiments, the method above further comprises receiving, from an event producer, a notification message including a second set of attributes and a status of a business event, and determining, based on the correlation set, whether the status is relevant to the instance. If the status is relevant to the instance, the exit criterion and/or the target condition is evaluated based on the status. If the exit criterion is satisfied, the status is sent to the instance and any further waiting for status information relevant to the instance is terminated. If the target condition is satisfied, the status is sent to the instance and the generic wait service continues to wait for status information relevant to the instance.

In one set of embodiments, the event producers are configured to communicate with an intermediary update service rather than the generic wait service. In these embodiments, the method above further comprises receiving, from the intermediary update service, a notification message including a second set of attributes and a status of a business event, the notification message originating from an event producer in communication with the intermediary update service, and determining, based on the correlation set, whether the status is relevant to the instance. If the status is relevant to the instance, the exit criterion is evaluated based on the status. If the exit criterion is satisfied, the status is sent to the instance and any further waiting for status information relevant to the instance is terminated. In an embodiment, the intermediary update service is configured to transform data in the notification message prior to sending the notification message to the generic wait service.

In one set of embodiments, the service-oriented application, generic wait service, and intermediary update service are internal to an organization, and the event producer is external to the organization.

According to another embodiment of the present invention, a system for pausing an instance of a service-oriented application is disclosed. The system comprises a first server for running the service-oriented application, and a second server for running a generic wait service. In various embodiments, the generic wait service is configured to receive, from the instance of the application, an initiation message including a first set of attributes that uniquely identifies the instance, and an exit criterion that identifies a condition that should be satisfied before the instance is allowed to proceed. The generic wait service then creates a correlation set based on the first set of attributes, the correlation set associating the first set of attributes with the instance, and waits for status information relevant to the instance.

In one set of embodiments, the generic wait service is further configured to receive, from an event producer, a notification message including a second set of attributes and a status of a business event, and determine, based on the correlation set, whether the status is relevant to the instance. If the status is relevant to the instance, the generic wait service is configured to determine, based on the status, whether the exit criterion is satisfied. If the exit criterion is satisfied, the generic wait service is configured to send the status to the instance and terminate any further waiting for status information relevant to the instance.

In one set of embodiments, the initiation message includes a target condition identifying a condition that the instance would like to be notified of. In these embodiments, the generic wait service is further configured to receive, from an event producer, a notification message including a second set of attributes and a status of a business event, and determine, based on the correlation set, whether the status is relevant to the instance. If the status is relevant to the instance, the generic wait service is configured to determine, based on the status, whether the exit criterion or the target condition is satisfied. If the exit criterion is satisfied, the generic wait service is configured to send the status to the instance and terminate any further waiting for status information relevant to the instance. If the target condition is satisfied, the generic wait service is configured to send the status to the instance and continue to wait for status information relevant to the instance.

In one set of embodiments, the system further comprises a third server for running an intermediary update service, wherein the intermediary update service is configured to receive, from an event producer, a notification message including a second set of attributes and a status of a business event, transform the notification message by converting the second set of attributes into a third set of attributes, and send the transformed notification message to the generic wait service. In these embodiments, the generic wait service is configured to receive the transformed notification message and determine, based on the correlation set, whether the status included in the transformed notification message is relevant to the instance. If the status is relevant to the instance, the generic wait service is configured to determine, based on the status, whether the exit criterion is satisfied. If the exit criterion is satisfied, the generic wait service is configured to send the status to the instance and terminate any further waiting for status information relevant to the instance. In one embodiment, the step of determining whether the status is relevant to the instance comprises comparing the third set of attributes to the first set of attributes.

According to another embodiment of the present invention, a machine-readable medium for a computer system is disclosed. The machine-readable medium has stored thereon program code which, when executed by a processing component of the computer system, causes the processing component to pause an instance of a service-oriented application. The program code comprises code for receiving, from the instance of the application, an initiation message including a first set of attributes that uniquely identifies the instance, and an exit criterion that uniquely identifies a condition that should be satisfied before the instance is allowed to proceed. The program code further comprises code for creating a correlation set based on the first set of attributes, the correlation set associating the first set of attributes with the instance, and code for waiting for status information relevant to the instance.

In one set of embodiments, the program code above further comprises code for receiving, from an event producer, a notification message including a second set of attributes and a status of a business event; code for determining, based on the correlation set, whether the status is relevant to the instance; code for, if the status is relevant to the instance, determining, based on the status, whether the exit criterion is satisfied; and code for, if the exit criterion is satisfied, sending the status to the instance and terminating any further waiting for status information relevant to the instance.

In one set of embodiments, the initiation message includes a target condition identifying a condition that the instance would like to be notified of. In these embodiments, the program code above further comprises code for receiving, from an event producer, a notification message including a second set of attributes and a status of a business event; code for determining, based on the correlation set, whether the status is relevant to the instance; code for, if the status is relevant to the instance, determining, based on the status, whether the exit criterion or the target condition is satisfied; code for, if the exit criterion is satisfied, sending the status to the instance and terminating any further waiting for status information relevant to the instance; and code for, if the target condition is satisfied, sending the status to the instance and continuing to wait for status information relevant to the instance.

In one set of embodiments, the event producers are configured to communicate with an intermediary update service rather than the generic wait service. In these embodiments, the program code above further comprises code for receiving, from the intermediary update service, a notification message including a second set of attributes and a status of a business event, the notification message originating from an event producer in communication with the intermediary update service; code for determining, based on the correlation set, whether the status is relevant to the instance; code for, if the status is relevant to the instance, determining, based on the status, whether the exit criterion is satisfied; and code for, if the exit criterion is satisfied, sending the status to the instance and terminating any further waiting for status information relevant to the instance. In an embodiment, the intermediary update service is configured to transform data in the notification message prior to sending the notification message to the generic wait service.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

In the drawings, the use of like reference numbers in different drawings indicates similar components.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details.

Embodiments of the present invention provide a generic wait service for facilitating the pausing of service-oriented applications (e.g., BPEL processes). As discussed above, it is often useful to pause a runtime instance of a service-oriented application until a specific business condition has been satisfied. The generic wait service of the present invention is capable of tracking these conditions for multiple paused instances, consuming status information from various event producers, determining, based on the consumed status information, whether any of the conditions have been satisfied, and notifying the paused instances accordingly.

Embodiments of the present invention have several advantages. First, unlike prior art approaches, these embodiments allow an application developer to define multiple simultaneous (or parallel) wait states in a single runtime instance. For example, the application developer could create one task flow that begins execution after a first wait state, and another task flow that begins execution after a second wait state that is parallel to the first. Second, these embodiments effectively de-couple the service-oriented applications from the event producers responsible for generating status information. In other words, the service-oriented applications do not need to be aware of the technical complexities involved in correlating a notification message received from an event producer to a particular paused instance, and the event producers do not need to be aware of the actual instances that are waiting for status information. Third, since the logic for implementing pausing functionality is encapsulated in the generic wait service, this logic does not need to duplicated in the service-oriented applications or the event producers, thereby reducing code duplication and increasing development productivity.

Figure 1:
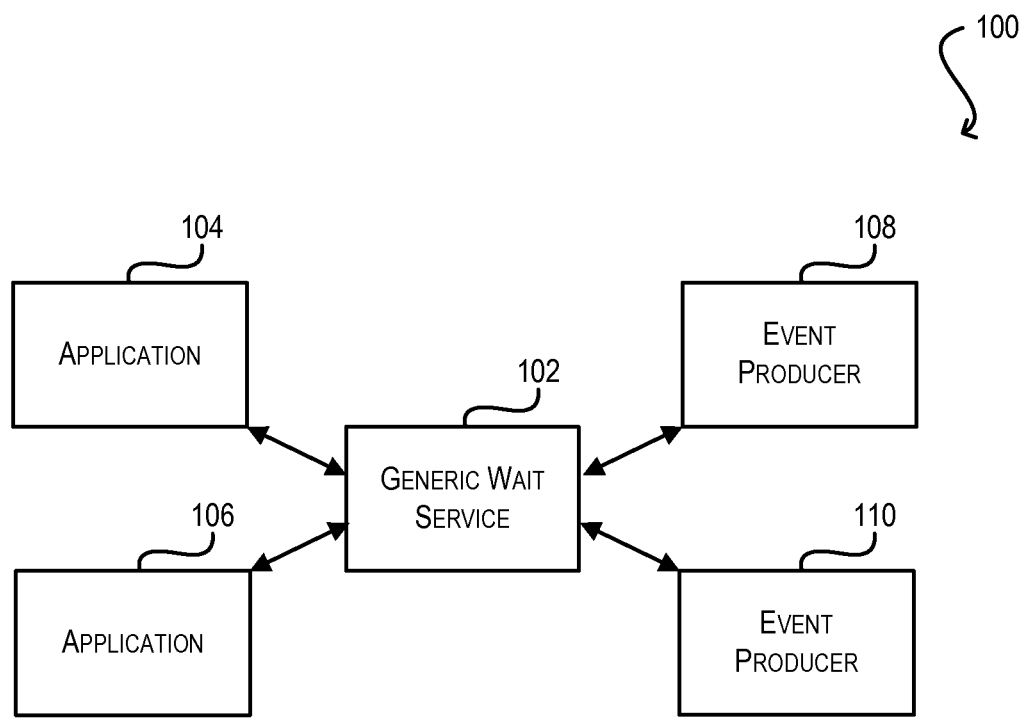
FIG. 1 is a simplified block diagram illustrating functional components of a service-oriented system in accordance with an embodiment of the present invention.

FIG. 1 is a simplified block diagram illustrating functional components of a service-oriented system 100 in accordance with an embodiment of the present invention. As shown, system 100 includes two applications 104, 106 and two event producers 108, 110. In one set of embodiments, applications 104, 106 are service-oriented applications that are designed to be paused until one or more business conditions are satisfied. Event producers 108, 110 are entities that generate status information (e.g., statuses of business events) relevant to those business conditions. For example, assume application 104 is an order fulfillment application and event producer 108 is an external shipping service. In this case, application 104 may be paused at a point in its task flow until its receives a notification from event producer 108 that a customer's order has been shipped. In one set of embodiments, applications 104, 106 and event producers 108, 110 are BPEL processes. In a further set of embodiments, applications 104, 106 and event producers 108,110 are implemented as web services.

To facilitate the pausing of applications 104, 106, system 100 includes a generic wait service 102. As shown, generic wait service 102 is a standalone service that is independent of applications 104, 106 and event producers 108, 110. Like applications 104, 106 and event producers 108, 110, generic wait service 102 may be a BPEL process. In one set of embodiments, generic wait service 102 is configured to receive initiation messages from instances of applications 104, 106 that identify the business conditions they are waiting for, and notification messages from event producers 108, 110 that identify the statuses of business events. Using the information received via these messages, generic wait service 102 can determine when the respective business conditions identified by the instances of applications 104, 106 are satisfied and notify the instances accordingly. In one set of embodiments, generic wait service 102 is configured to correlate the notification messages received from event producers 108, 110 to particular application instances via key attributes associated with each instance. This enables generic wait service 102 to process multiple paused instances simultaneously. The interactions between applications 104, 106, event producers 108, 110, and generic wait service 102 are discussed in further detail below.

It should be appreciated that FIG. 1 illustrates a particular functional configuration of a service-oriented system according to an embodiment of the present invention. Other configurations are possible according to alternative embodiments. For example, although only two applications and two event producers are depicted, any number of applications and event producers may be supported by a single generic wait service. One of ordinary skill in the art would recognize many variations, modifications, and alternatives.

Figure 2:
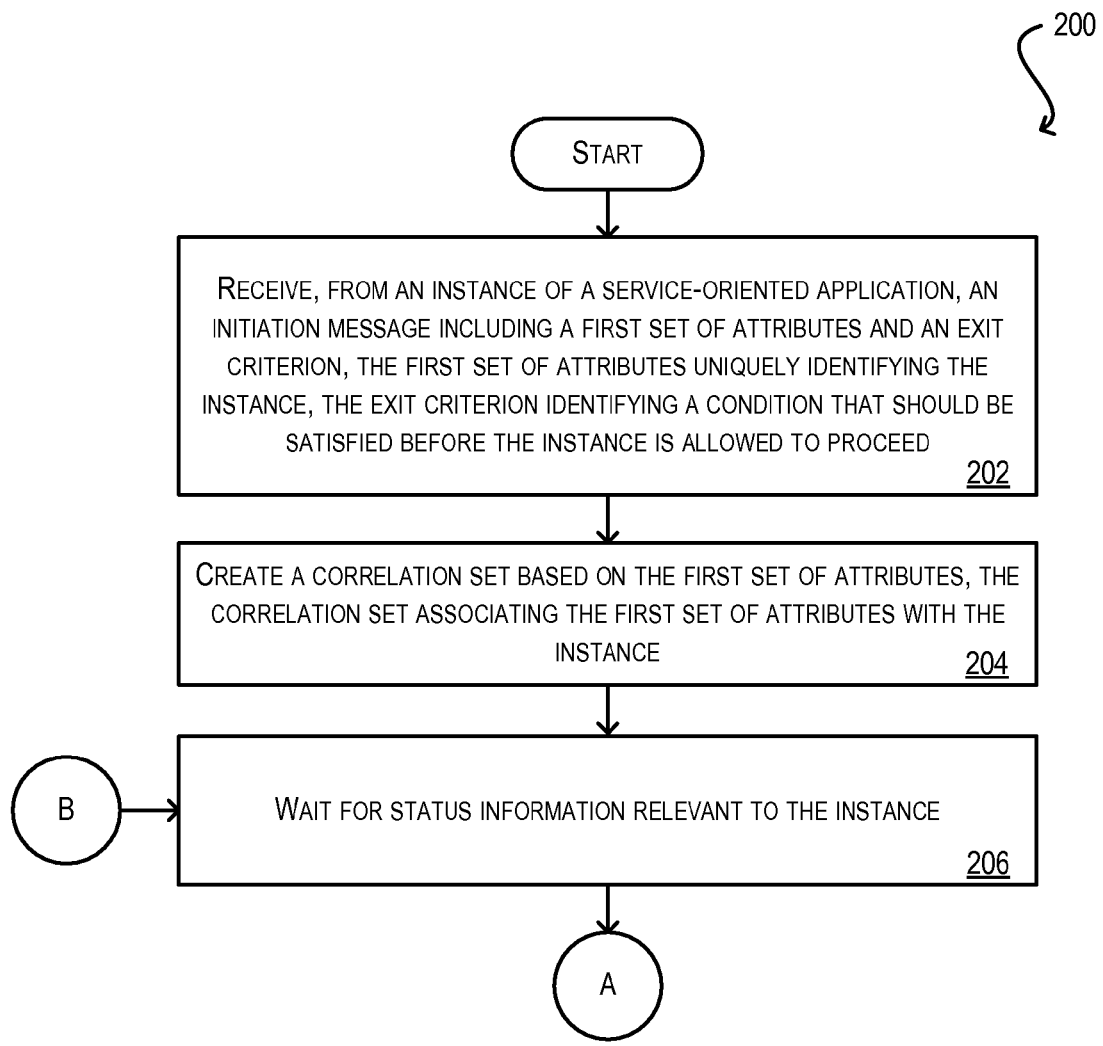
FIG. 2 is a flowchart illustrating steps performed by a generic wait service in processing an initiation message received from a service-oriented application in accordance with an embodiment of the present invention.

FIG. 2 is a flowchart 200 illustrating steps performed for pausing an instance of a service-oriented application in accordance with an embodiment of the present invention. In particular, flowchart 200 illustrates steps that may be performed by generic wait service 102 for pausing an instance of application 102 or application 104.

At step 202, a generic wait service (e.g., generic wait service 102) receives, from an instance of a service-oriented application (e.g., application 102, 104), an initialization message comprising a first set of attributes and an exit criterion. The first set of attributes are key attributes that uniquely identify the instance, and the exit criterion identifies a business condition that should be satisfied before the instance is allowed to proceed. For example, generic wait service 102 may receive from an instance of application 104 an initiation message comprising an order ID (that uniquely identifies the order being processed by the instance) and an exit criterion of "order status=shipped."

At step 204, the generic wait service creates a correlation set based on the first set of attributes, where the correlation set associates the first set of attributes and the exit criterion with the instance. Since the generic wait service may receive initiation messages from a plurality of different application instances (each with different key attributes and exit criteria), the correlation set is used to map, or correlate, notification messages received from event producers to the specific instance of step 202.

Once the correlation set is created, the generic wait service waits for status information from one or more event producers (e.g., event producers 108, 110) (step 206). To facilitate this, the generic wait service will typically expose a one-way notification operation that is invoked by the event producers when a business condition is satisfied or the status of a business event changes. Although not shown in flowchart 100, it is important to note that the calling application instance can continue to execute parallel task flows (i.e., task flows independent of the currently paused flow) while the generic wait service is waiting for status information in step 206. In other words, the generic wait service operates asynchronously of the calling instance. Once the generic wait service receives notification that the exit criterion is satisfied and sends that information to the calling instance, the calling instance can resume execution of the paused task flow.

It should be appreciated that the steps illustrated in FIG. 2 provide a particular method for pausing an instance of a service-oriented application in accordance with an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 3:
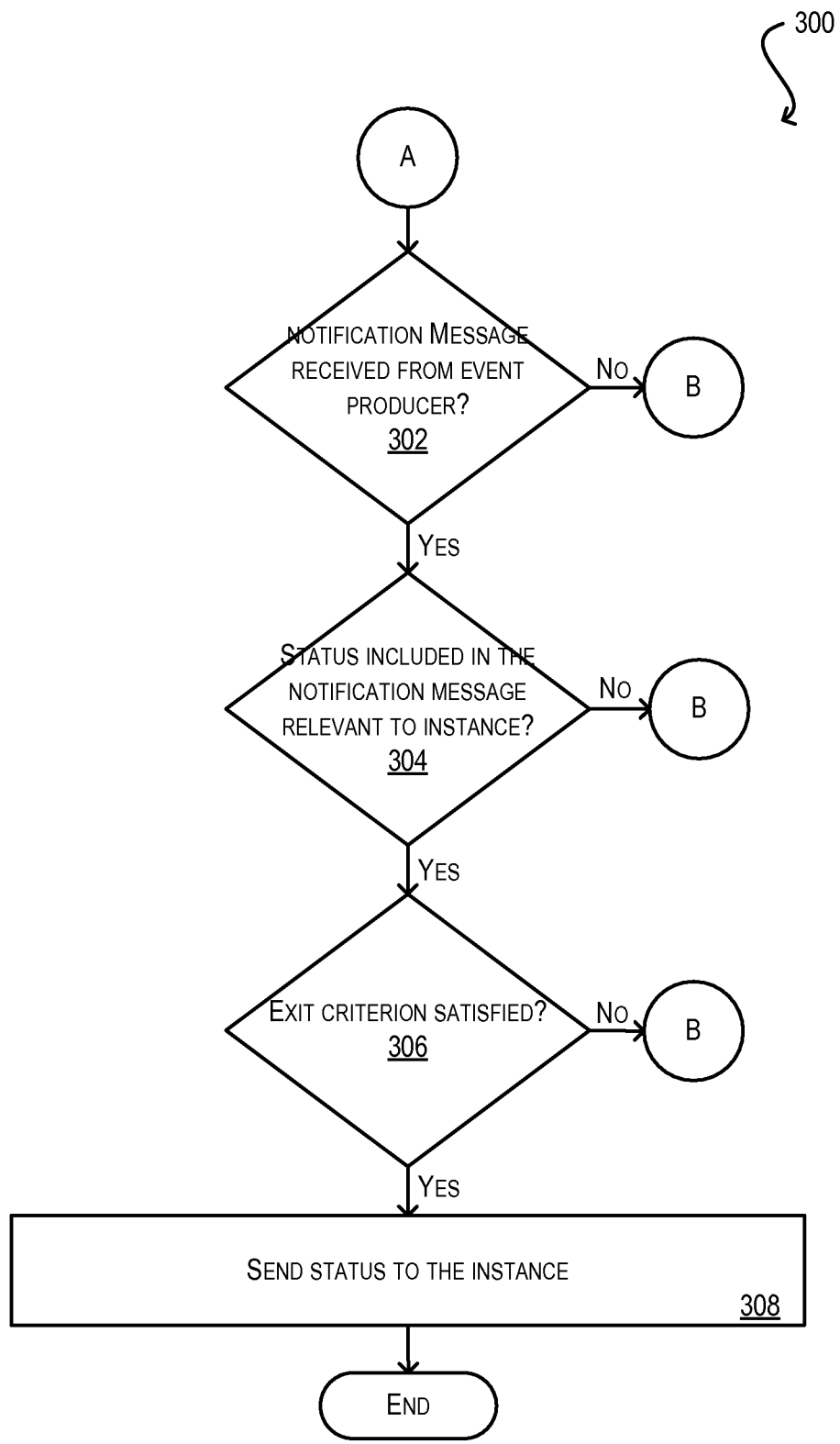
FIG. 3 is a flowchart illustrating steps performed by a generic wait service in processing a notification message received from an event producer in accordance with an embodiment of the present invention.

FIG. 3 is a flowchart 300 illustrating steps performed by a generic wait service in processing a notification message received from an event producer in accordance with an embodiment of the present invention. In particular, flowchart 300 represents a continuation of the processing in flowchart 200.

At step 302, the generic wait service checks whether it has received any notification messages from event producers. If it has not, the generic wait service continues waiting as per step 206 of flowchart 200. If it has received a notification message, the generic wait service evaluates the message to determine (1) whether it is relevant to the paused instance of step 202 (step 304), and (2) whether the exit criterion is satisfied (step 306). Generally speaking, the notification message will include a status of a business event and a set of key attributes indicating the particular entity/process that the status is related to. For example, a notification message from event producer 108 may include an order ID and a shipping status for the order. Thus, the generic wait service can determine whether the notification message is relevant to the paused instance by comparing the key attributes in the notification message to the key attributes associated with the paused instance (via the correlation set created in step 204). Further, the generic wait service can determine whether the exit criterion is satisfied based on the status of the business event.

If the notification message is determined to be relevant to the paused instance, and if the notification message indicates that the exit criterion is satisfied, the status is sent to the paused instance (step 308). In this manner, the instance is notified that it can proceed to the next task or step in its flow. Although not shown, the generic wait service will also terminate any further waiting for notification messages relevant to the instance. In one embodiment, this comprises deleting the correlation set for the instance. However, the generic wait service will continue waiting for notification messages that are relevant to other paused instances.

It should be appreciated that the steps illustrated in FIG. 3 provide a particular method for processing a notification message received from an event producer in accordance with an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 4:
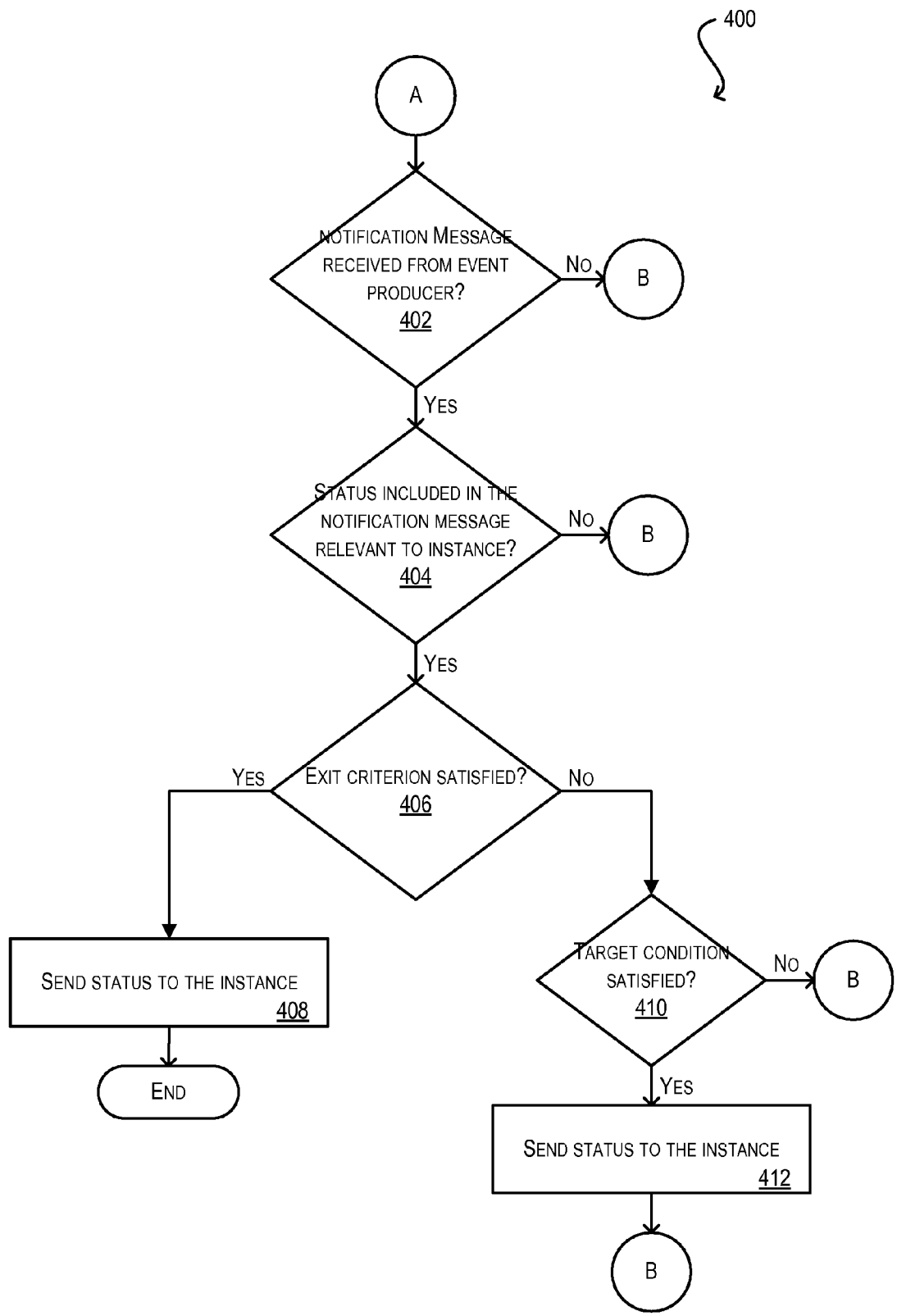
FIG. 4 is a flowchart illustrating further steps performed by a generic wait service in processing a notification message received from an event producer in accordance with an embodiment of the present invention.

In some embodiments, the initialization message received at step 202 of flowchart 200 may include (in addition to the key attributes and the exit criterion) one or more target conditions. These target conditions are business conditions that the calling instance is interested in being notified of while waiting for the exit criterion to be satisfied. For example, application 104 might be interested in knowing when a customer order is assigned an estimated shipping date while waiting for the order to be shipped. FIG. 4 is a flowchart 400 illustrating steps performed by a generic wait service in processing a notification message when the paused instance has specified a target condition.

At steps 402 and 404, the generic wait service determines whether a notification message is received, and if so, whether the message is relevant to the paused instance. These steps are substantially similar to steps 302 and 304 of flowchart 300. At step 406, the exit criterion for the paused instance is evaluated based on status information included in the received notification message. If the exit criterion is satisfied, the status is sent to the paused instance and the generic wait service terminates any further waiting for the instance (step 408). If the exit criterion is not satisfied, the target condition is evaluated based on the status information. If the target condition is satisfied, the status is sent to the instance and the generic wait service continues waiting for notification messages relevant to the instance (step 412). Further, even if the target condition is not satisfied, the generic wait service continues waiting for notification message relevant to the instance. Thus, the waiting process will only terminate once the exit criterion has been reached.

It should be appreciated that the steps illustrated in FIG. 4 provide a particular method for processing a notification message received from an event producer in accordance with an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 5:
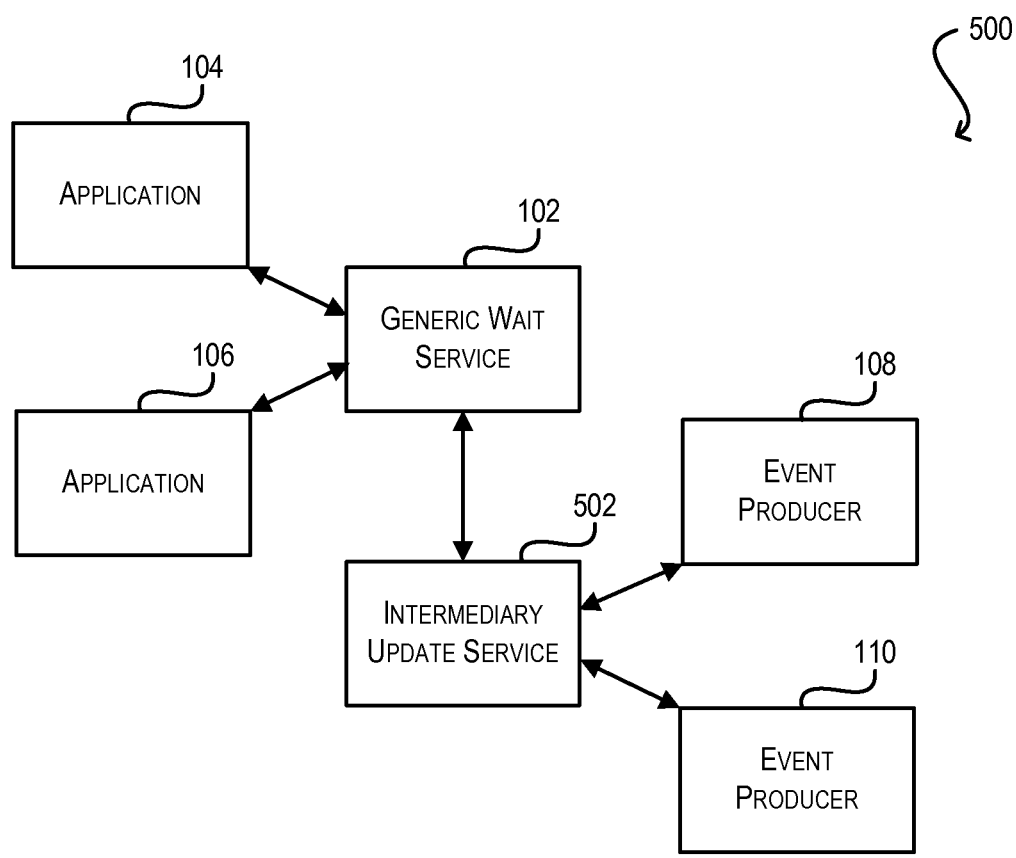
FIG. 5 is a simplified block diagram illustrating functional components of another service-oriented system in accordance with an embodiment of the present invention.

FIG. 5 is a simplified block diagram illustrating functional components of another service-oriented system 500 in accordance with an embodiment of the present invention. Like system 100 of FIG. 1, system 500 includes service-oriented applications 104, 106, event producers 108, 110, and generic wait service 102. However, system 500 also includes an intermediary update service 502 that acts as an interface between generic wait service 102 and event producers 108, 110. Specifically, intermediary update service 502 is configured to receive notification messages from event producers 108, 110 and route those messages to generic wait service 102. In situations where generic wait service 102 is internal to an enterprise and event producers 108, 110 are external to the enterprise, this type of configuration is useful in protecting the generic wait service from direct exposure to external networks.

In addition, intermediary update service 502 can be configured to perform some transformation and/or enrichment of the information received from event producers 108, 110 prior to sending the information to generic wait service 102. For example, in some cases the event producers may refer to business entities/events using key attributes that do not directly correspond to the key attributes used by applications 104, 106. In these cases, intermediary update service 502 can store mappings between these disparate key attribute sets and transform one set to another as appropriate. Thus, if event producer 108 or 110 sends a notification message to intermediary update service 502 comprising key attributes that are unknown to applications 102, 104 or generic wait service 102, the update service will transform those key attributes into a known set of attributes prior to forwarding the notification message to the generic wait service.

Figure 6:
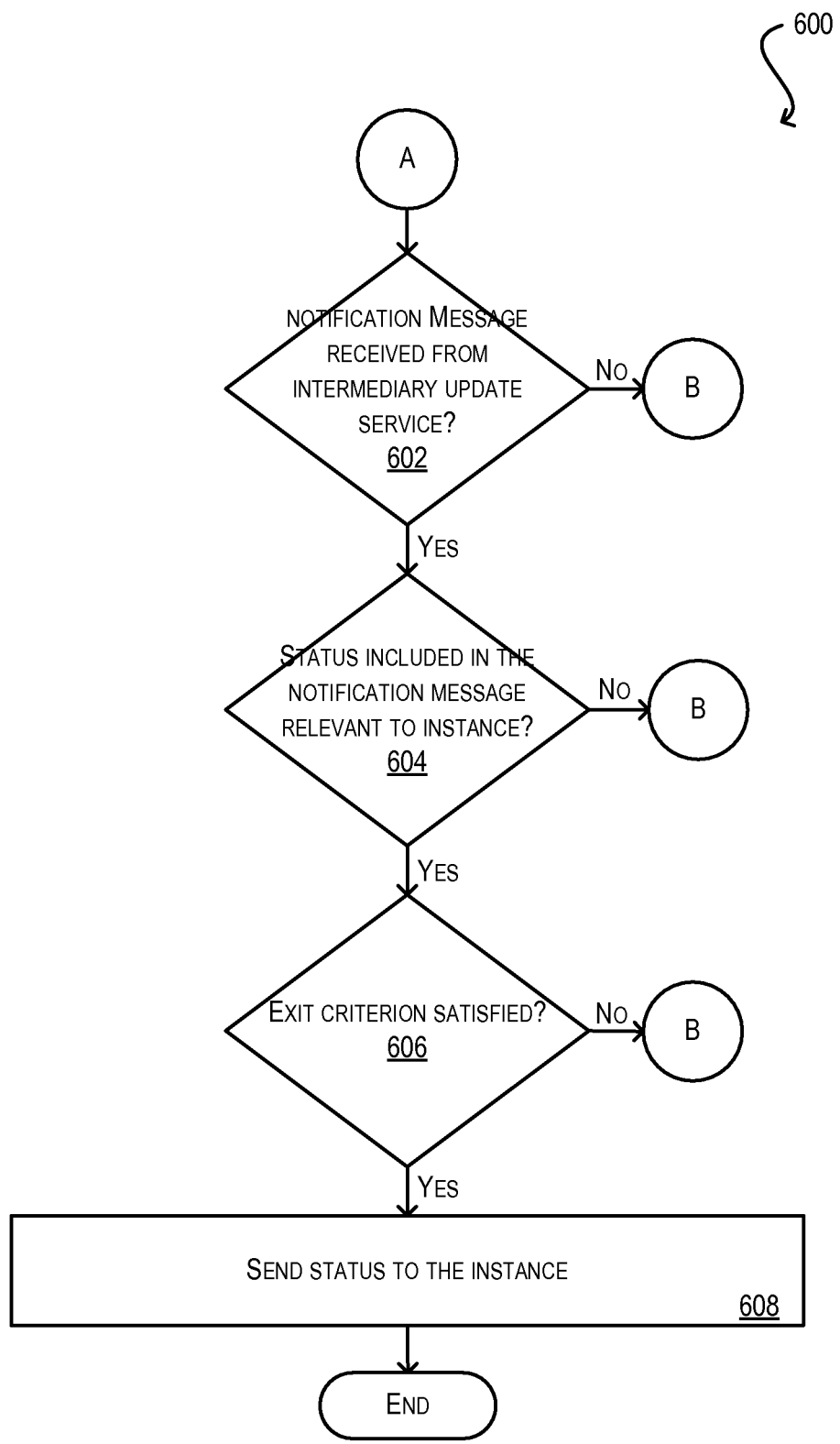
FIG. 6 is a flowchart illustrating steps performed by a generic wait service in processing a notification message received from an intermediary update service in accordance with an embodiment of the present invention.

FIG. 6 is a flowchart illustrating steps performed for processing a notification message received from an intermediary update service in accordance with an embodiment of the present invention. In particular, flowchart 600 illustrates the steps performed by generic wait service 102 in processing notification messages received from intermediary update service 502. The steps of flowchart 600 are substantially similar to flowchart 300 of FIG. 3. However, as shown in step 602, the notification message is received from the update service rather than directly from the event producers.

Figure 7:
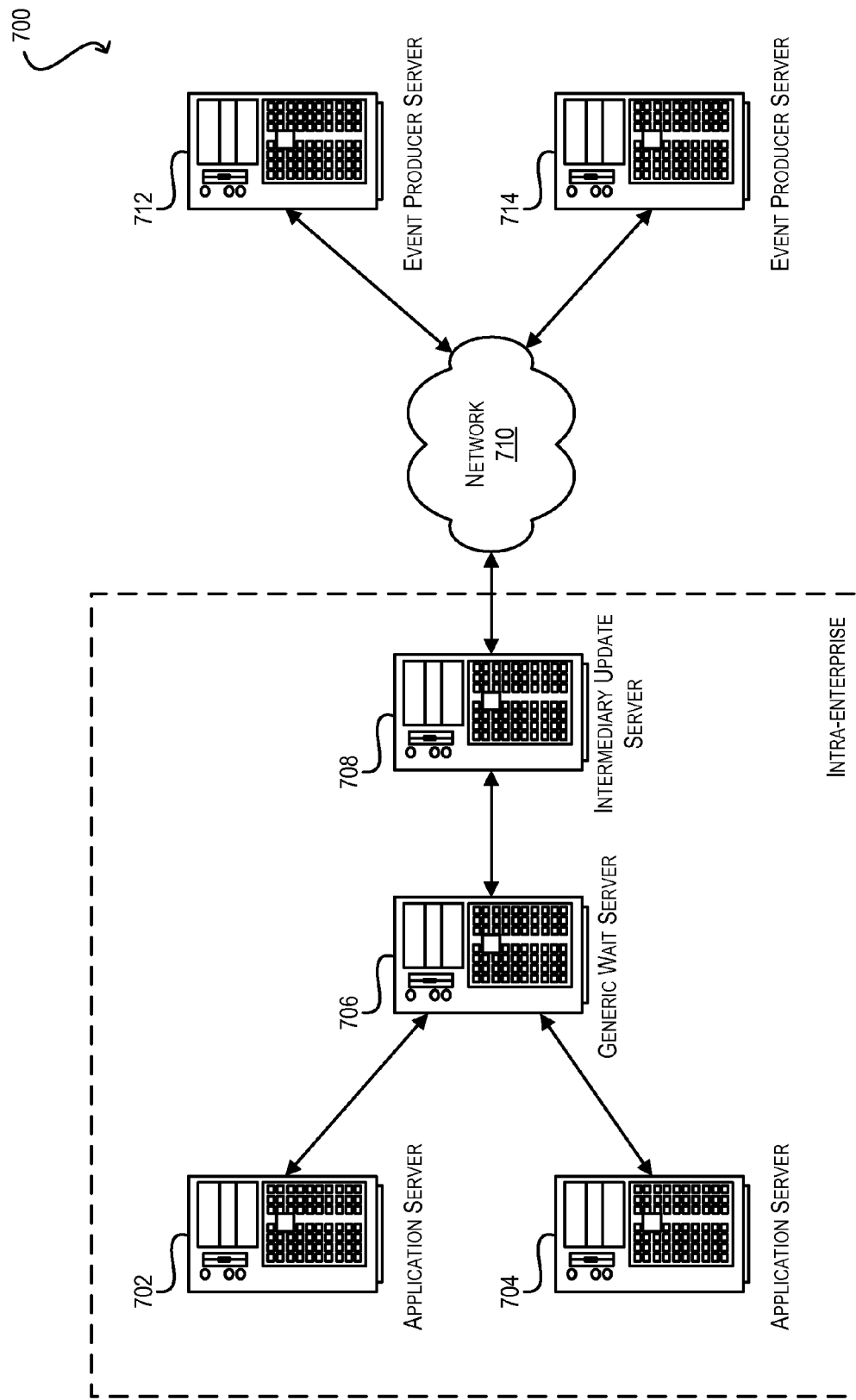
FIG. 7 is a simplified block diagram illustrating a system environment that may be used in accordance with an embodiment of the present invention.

FIG. 7 is a simplified block diagram illustrating components of a system environment 700 that may be used to implement embodiments of the present invention. As shown, system environment 700 includes one or more server computers 702, 704, 706, 708, 712, 714 which may be general purpose computers, specialized server computers (i.e., PC servers, UNIX servers, mid-range servers, mainframe computers rack-mounted servers, etc.), server farms, server clusters, or any other appropriate arrangement and/or combination. In various embodiments, servers 702, 704, 706, 708, 712, 714 are adapted to run one or more services or software applications described in the foregoing disclosure. For example, application servers 702, 704 may be configured to run service-oriented applications 104, 106, generic wait server 706 may be configured to run generic wait service 102, intermediary update server 708 may be configured to run intermediary update service 502, and event producer servers 712, 714 may be configured to run event producers 108, 110. It should be appreciates that system environment 700 illustrates a particular configuration of servers, and other configurations are also within the scope of the present invention. For example, although two application servers, one generic wait server, one intermediary update server, and two event producer servers are shown, any number of such servers may be supported. Further, the function of various servers may, in certain embodiments, be consolidated into a single server. Yet further, although servers 702, 704, 706, 708 are shown as being "intra-enterprise" (i.e., situated within an enterprise) and servers 712, 714 are shown as being "extra-enterprise" (i.e., situated outside the enterprise), this configuration may be rearranged such that any of the servers are situated within, or outside, an enterprise.

Each server 702, 704, 706, 708, 712, 714 is configured to run an operating system, such as Microsoft Windows XP or Vista, Apple OSX, and/or UNIX-based operating systems (including without limitation the variety of GNU/Linux operating systems). Servers 702, 704, 706, 708, 712, 714 may also run any of a variety of additional server applications and/or mid-tier applications, including the services described herein. In one set of embodiments, servers 702, 704, 706, 708, 712, 714 are implemented as Web-based services. In these embodiments, servers 702, 704, 706, 708, 712, 714 may be configured to run one or more HTTP servers.

As shown, system environment 700 includes a network 710. Network 710 may be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Although not shown, system environment 700 may also include one or more databases. For instance, these databases may include a repository for storing correlation set data used by generic wait server 706 and/or intermediary update server 708. The databases may reside in a variety of locations. By way of example, the databases may reside on a storage medium local to (and/or resident in) one or more of the servers 702, 704, 706, 708, 712, 714. Alternatively, the databases may be remote from any or all of the servers 702, 704, 706, 708, 712, 714, and/or in communication (e.g., via network 710) with one or more of these. In one set of embodiments, the databases may reside in a storage-area network (SAN) familiar to those skilled in the art. Similarly, any necessary files for performing the functions attributed to the servers 702, 704, 706, 708, 712, 714 may be stored locally on the respective server and/or remotely, as appropriate. In one set of embodiments, the databases may include relational databases, such as Oracle 10g, that are adapted to store, update, and retrieve data in response to SQL-formatted commands.

Figure 8:
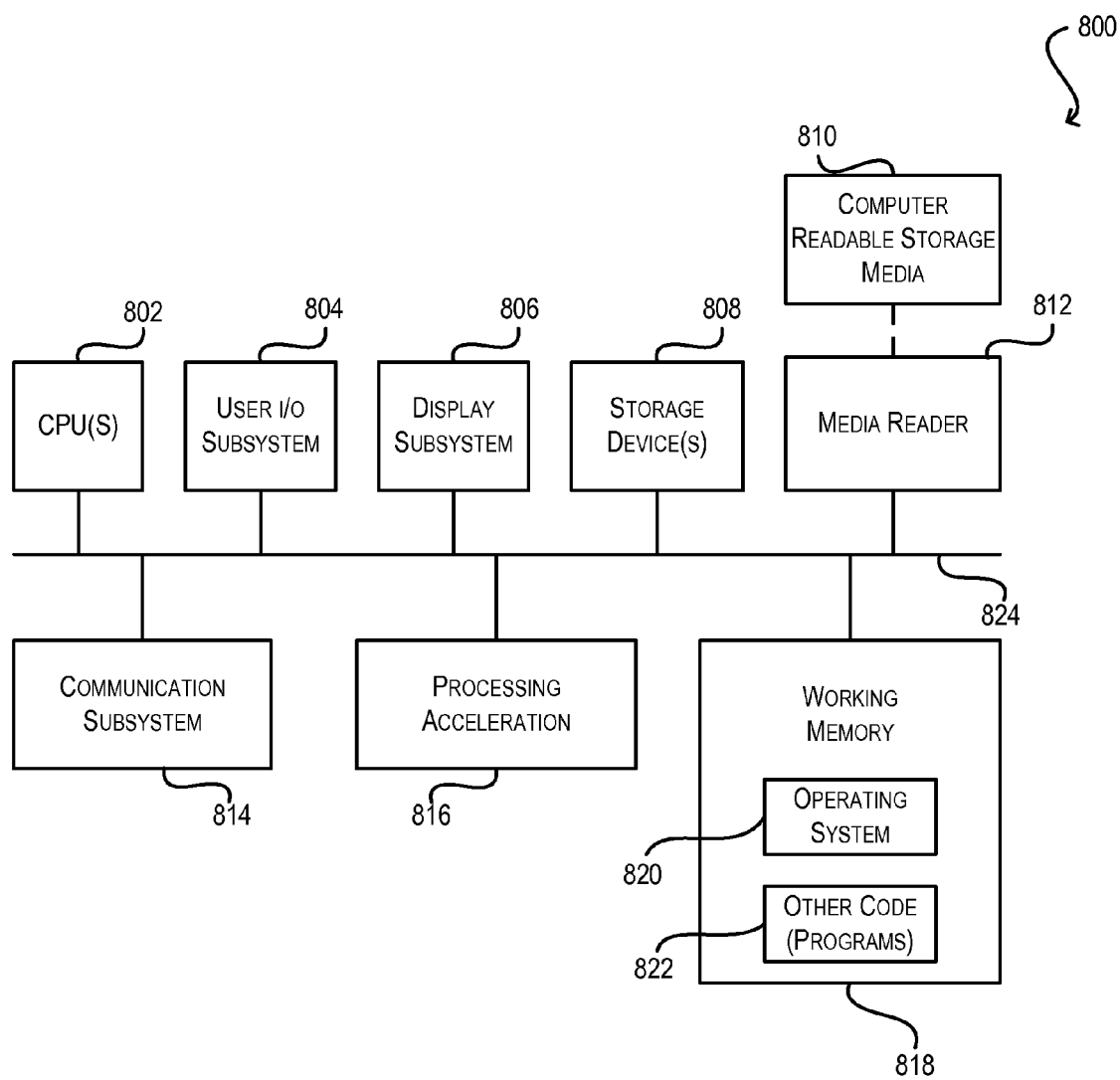
FIG. 8 is a simplified block diagram illustrating a computer system that may be used in accordance with an embodiment of the present invention.

FIG. 8 illustrates an exemplary computer system 800 that may be used in accordance with embodiments of the present invention. In various embodiments, computer system 800 may be used to implement any of the servers 702, 704, 706, 708, 712, 714 described above. Computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). Computer system 800 may also include one or more storage devices 808. By way of example, the storage device(s) 808 may include devices such as disk drives, optical storage devices, and solid-state storage devices such as a random access memory (RAM) and/or a read-only memory (ROM), which can be programmable, flash-updateable and/or the like.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 may permit data to be exchanged with network 710 and/or any other computer described above with respect to system environment 700.

Computer system 800 may also comprise software elements, shown as being currently located within working memory 818, including an operating system 820 and/or other code 822, such as code for service-oriented applications 104, 106, generic wait service 102, intermediary update service 502, and/or event producers 108, 110. It should be appreciated that alternative embodiments of computer system 800 may have numerous variations from that described above. For example, customized hardware might also be used and/or particular elements might be implemented in hardware, software, or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method performed by a generic wait service for pausing an instance of a service-oriented application the method comprising:

receiving, from the instance of the service-oriented application, an initiation message including a first set of attributes and an exit criterion, the first set of attributes uniquely identifying the instance, the exit criterion identifying a condition that should be satisfied before the instance is allowed to resume;

defining two or more wait states in parallel for the instance, wherein the two or more wait states include a first wait state in which a first task flow begins execution after the first wait state and a second wait state in which a second task flow begins execution after the second wait state which is parallel to the first wait state;

de-coupling the service-oriented application from event producers responsible for generating status information, wherein the service-oriented application is not required to be aware of technical complexities involved in correlating a notification message received from the event producers to a particular paused instance, and the event producers are not required to be aware of the instance that is waiting for status information;

based on the first and second wait states, creating a correlation set based on the first set of attributes, the correlation set associating the first set of attributes with the instance;

pausing the instance;

waiting for status information relevant to the instance;

receiving, from an event producer, a notification message including a second set of attributes and a status of a business event;

determining, based on the correlation set, that the status is relevant to the instance;

determining, based on the status, that the exit criterion is satisfied; and in response to the exit criterion being satisfied, sending the status to the instance and resuming the instance.

2. The method of claim 1, wherein the service-oriented application and the generic wait service are Business Process Execution Language (BPEL) processes.

3. The method of claim 2, wherein the generic wait service is an asynchronous BPEL process.

4. The method of claim 1, wherein the event producer is a web service.

5. The method of claim 1, wherein determining, based on the correlation set, whether the status is relevant to the instance comprises comparing the second set of attributes to the first set of attributes.

6. The method of claim 1, further comprising terminating the waiting for status information relevant to the instance by deleting the correlation set.

7. The method of claim 1, wherein the initiation message further includes a target condition, the target condition identifying a condition that the instance would like to be notified of, and wherein the method further comprises:
   if the status is relevant to the instance, determining, based on the status, whether the exit criterion or the target condition is satisfied;
   if the exit criterion is satisfied:
      sending the status to the instance; and
      terminating any further waiting for status information relevant to the instance; and
   if the target condition is satisfied:
      sending the status to the instance; and
      continuing to wait for status information relevant to the instance.

8. The method of claim 1, wherein the method further comprises:
   receiving, from an intermediary update service, the notification message, the notification message originating from the event producer in communication with the intermediary update service;
   if the status is relevant to the instance, determining, based on the status, whether the exit criterion is satisfied; and
   if the exit criterion is satisfied:
      sending the status to the instance; and
      terminating any further waiting for status information relevant to the instance.

9. The method of claim 8, wherein the intermediary update service is configured to transform data in the notification message prior to sending the notification message to the generic wait service.

10. The method of claim 8, wherein the service-oriented application, generic wait service, and intermediary service are internal to an organization, and wherein the event producer is external to the organization.

11. A system for pausing an instance of a service-oriented application, the system comprising:
   a first server for running the service-oriented application; and
   a second server for running a generic wait service, wherein the generic wait service is configured to:
      receive, from the instance of the service-oriented application, an initiation message including a first set of attributes and an exit criterion, the first set of attributes uniquely identifying the instance, the exit criterion identifying a condition that should be satisfied before the instance is allowed to resume;
      define two or more wait states in parallel for the instance, wherein the two or more wait states include a first wait state in which a first task flow begins execution after the first wait state and a second wait state in which a second task flow begins execution after the second wait state which is parallel to the first wait state;
      de-couple the service-oriented application from event producers responsible for generating status information, wherein the service-oriented application is not required to be aware of technical complexities involved in correlating a notification message received from the event producers to a particular paused instance, and the event producers are not required to be aware of the instance that is waiting for status information;
      based on the first and second wait states, create a correlation set based on the first set of attributes, the correlation set associating the first set of attributes with the instance;
      pause the instance;
      wait for status information relevant to the instance;
      receive, from an event producer, a notification message including a second set of attributes and a status of a business event;
      determine, based on the correlation set, that the status is relevant to the instance;
      determine, based on the status, that the exit criterion is satisfied; and
      in response to the exit criterion being satisfied, send the status to the instance and resuming the instance.

12. The system of claim 11, wherein the initiation message further includes a target condition, the target condition identifying a condition that the instance would like to be notified of, and wherein the generic wait service is further configured to:
   if the status is relevant to the instance, determine, based on the status, whether the exit criterion or the target condition is satisfied;
   if the exit criterion is satisfied:
      send the status to the instance; and
      terminate any further waiting for status information relevant to the instance; and
   if the target condition is satisfied:
      send the status to the instance; and
      continue to wait for status information relevant to the instance.

13. The system of claim 11 further comprising:
   a third server for running an intermediary update service, wherein the intermediary update service is configured to:
      receive, from the event producer, the notification message;
      transform the notification message by converting the second set of attributes into a third set of attributes; and
      send the transformed notification message to the generic wait service;
   and wherein the generic wait service is further configured to:
      receive the transformed notification message;
      determine, based on the correlation set, whether the status included in the transformed notification message is relevant to the instance;
      if the status is relevant to the instance, determine, based on the status, whether the exit criterion is satisfied; and
      if the exit criterion is satisfied:
         send the status to the instance; and
         terminate any further waiting for status information relevant to the instance.

14. The system of claim 13, wherein determining, based on the correlation set, whether the status is relevant to the instance comprises comparing the third set of attributes to the first set of attributes.

15. A non-transitory machine-readable medium for a computer system, the machine-readable medium having stored thereon program code which, when executed by a processing component of the computer system, causes the processing component to:
- receive, from the instance of the service-oriented application, an initiation message including a first set of attributes and an exit criterion, the first set of attributes uniquely identifying the instance, the exit criterion identifying a condition that should be satisfied before the instance is allowed to resume;
- define two or more wait states in parallel for the instance, wherein the two or more wait states include a first wait state in which a first task flow begins execution after the first wait state and a second wait state in which a second task flow begins execution after the second wait state which is parallel to the first wait state;
- de-couple the service-oriented application from event producers responsible for generating status information, wherein the service-oriented application is not required to be aware of technical complexities involved in correlating a notification message received from the event producers to a particular paused instance, and the event producers are not required to be aware of the instance that is waiting for status information;
- based on the first and second wait states, create a correlation set based on the first set of attributes, the correlation set associating the first set of attributes with the instance;
- pause the instance;
- wait for status information relevant to the instance;
- receive, from an event producer, a notification message including a second set of attributes and a status of a business event;
- determine, based on the correlation set, that the status is relevant to the instance;
- determine, based on the status, that the exit criterion is satisfied; and
- in response to the exit criterion being satisfied, send the status to the instance and resuming the instance.

16. The non-transitory machine-readable medium of claim 15, wherein the initiation message further includes a target condition, the target condition identifying a condition that the instance would like to be notified of, and wherein the program code further causes the processing component to:
- if the status is relevant to the instance, determine, based on the status, whether the exit criterion or the target condition is satisfied;
- if the exit criterion is satisfied, send the status to the instance, and terminating any further waiting for status information relevant to the instance; and
- if the target condition is satisfied, send the status to the instance, and continuing to wait for status information relevant to the instance.

17. The non-transitory machine-readable medium of claim 15, wherein the program code further causes the processing component to:
- receive, from an intermediary update service, the notification message, the notification message originating from the event producer in communication with the intermediary update service;
- based on the correlation set, whether the status is relevant to the instance;
- if the status is relevant to the instance, determine, based on the status, whether the exit criterion is satisfied; and
- if the exit criterion is satisfied, send the status to the instance, and terminating any further waiting for status information relevant to the instance.

18. The non-transitory machine-readable medium of claim 17, wherein the intermediary update service is configured to transform data in the notification message prior to sending the notification message to the generic wait service.

* * * * *